Aug. 22, 1961     G. P. McGRAW, JR     2,997,018
MACHINE FOR DIP-COATING ARTICLES
Filed Dec. 11, 1958     4 Sheets-Sheet 1

INVENTOR
G. P. McGRAW JR.
BY R. P. Miller
ATTORNEY

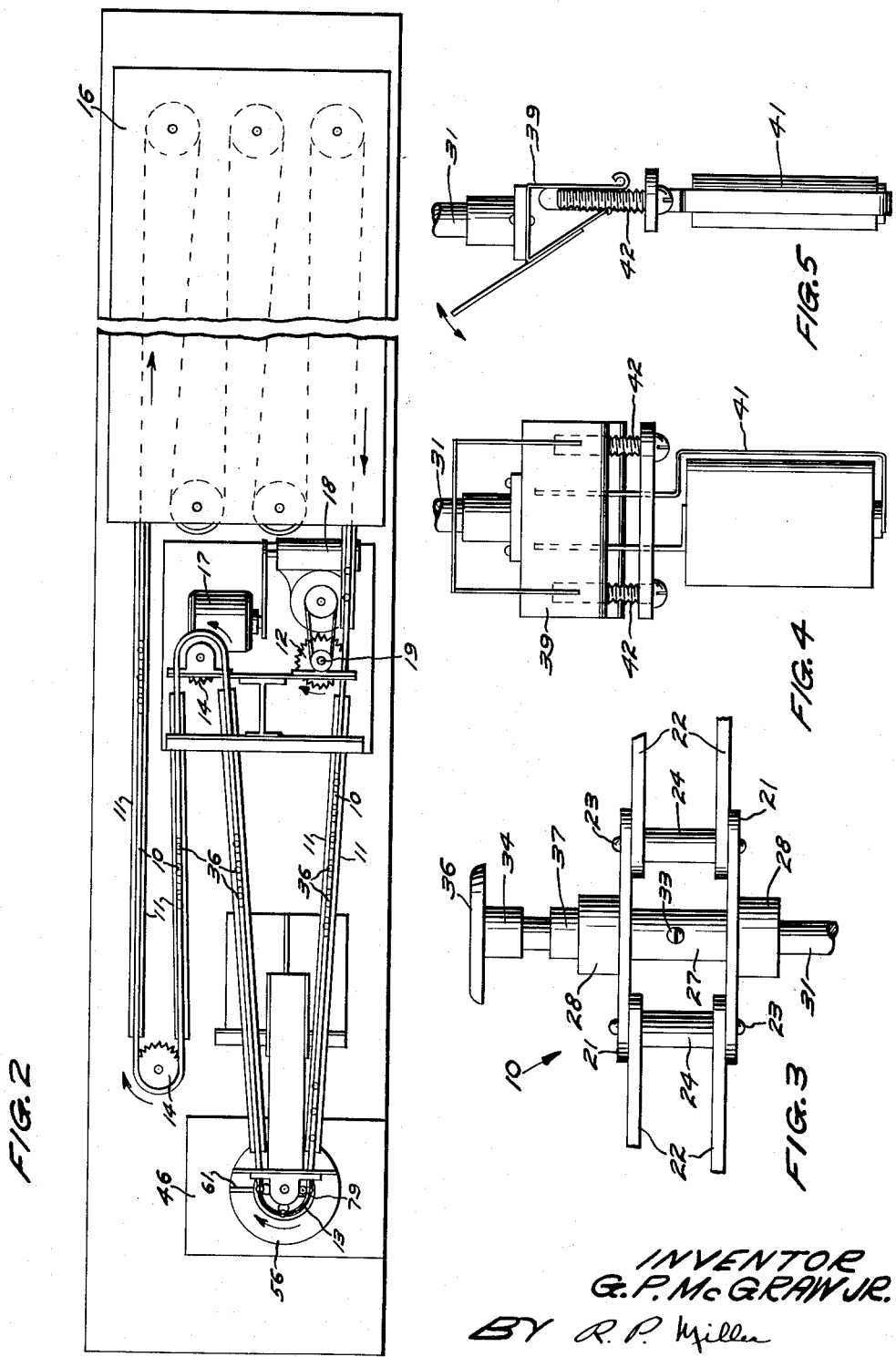

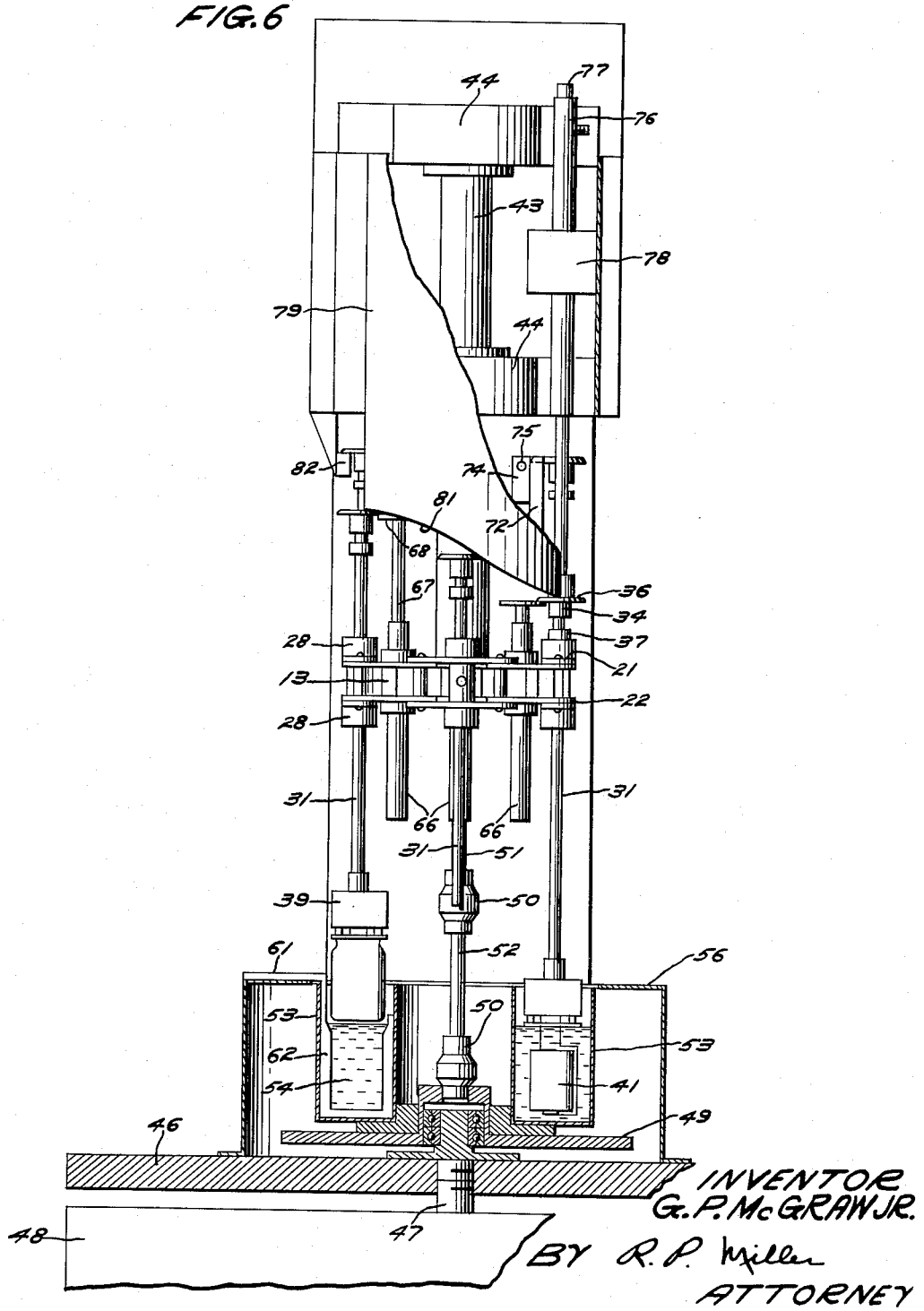

Aug. 22, 1961  G. P. McGRAW, JR  2,997,018
MACHINE FOR DIP-COATING ARTICLES
Filed Dec. 11, 1958  4 Sheets-Sheet 4

INVENTOR
G. P. McGRAW JR.
BY R. P. Miller
ATTORNEY

United States Patent Office 2,997,018
Patented Aug. 22, 1961

2,997,018
MACHINE FOR DIP-COATING ARTICLES
George P. McGraw, Jr., Downers Grove, Ill., assignor to Western Electric Company, Incorporated, New York, N.Y., a corporation of New York
Filed Dec. 11, 1958, Ser. No. 779,712
10 Claims. (Cl. 118—612)

This invention relates to a machine for dip-coating articles and more particularly, to a machine which conveys and immerses articles in a coating tank whereafter the articles and tank move in unison for a period necessary to coat the articles.

When manufactured articles, such as capacitors, are to be provided with a heavy coating or are to be coated with a thick or viscous material, such as a plastic compound, difficulties have been encountered in providing a fast and economical method of applying the coating or in providing a machine for performing the coating operation. For example, it is desirable to provide a continuous movement of articles through the coating material to increase the rate of production, however, relative flow between the articles and the coating material should be avoided if a uniform coating of the article is to be obtained. Also, many plastic coating materials of the thermosetting variety harden or set by self-generated heat and it is therefore desirable to provide an apparatus which will retard the hardening or setting process of the coating material.

It is therefore an object of this invention to provide a new and improved machine for dip-coating articles.

Another object of this invention is to provide a machine for continuously conveying articles through a dip-coating station while preventing relative flow between the articles and the coating material.

Another object of the invention is to provide a machine for dip-coating articles in a self-hardening coating material which retards the hardening process of the coating material.

A further object of this invention is to provide a conveyor system which moves articles over a horizontal path and imparts vertical movements to the articles relative to the conveyor.

A still further object of the invention is to provide a dip-coating machine having an article conveyor for dipping articles carried thereby into a container of coating material moving at the same speed as the conveyor.

With these and other objects in view, the present invention contemplates a machine for the dip-coating of articles which comprises a continuously moving conveyor having vertically extending elements slidably mounted thereon for gripping articles on the lower extremity thereof and for moving the articles with the conveyor. Positioned beneath a portion of the path traversed by the conveyor is a movably mounted container of coating material which is moved along a portion of the conveyor path at the same speed as the movement of the conveyor to prevent a relative movement between the coating material and articles immersed therein. An arrangement of cams is positioned along the path of the conveyor for moving the article-carrying rods over the walls of the container for immersing and withdrawing the articles from the coating material.

Other objects, advantages and novel aspects of the invention will become apparent upon consideration of the following detailed description in conjunction with the accompanying drawings wherein:

FIG. 2 is a top view of the dip-coating machine shown in FIG. 1;

FIG. 3 is an enlarged fragmentary view disclosing a mounting for supporting vertical rods for movement within a link of a chain conveyor;

FIGS. 4 and 5 are an enlarged plan and side elevation views, respectively, of an article-gripping means mounted on the lower extremity of the rod shown in FIG. 3;

FIG. 6 is an enlarged view, partially in section, taken along lines 6—6 of FIG. 1 disclosing an arrangement of mechanisms for immersing articles in a rotating container of coating material;

Figure 1:
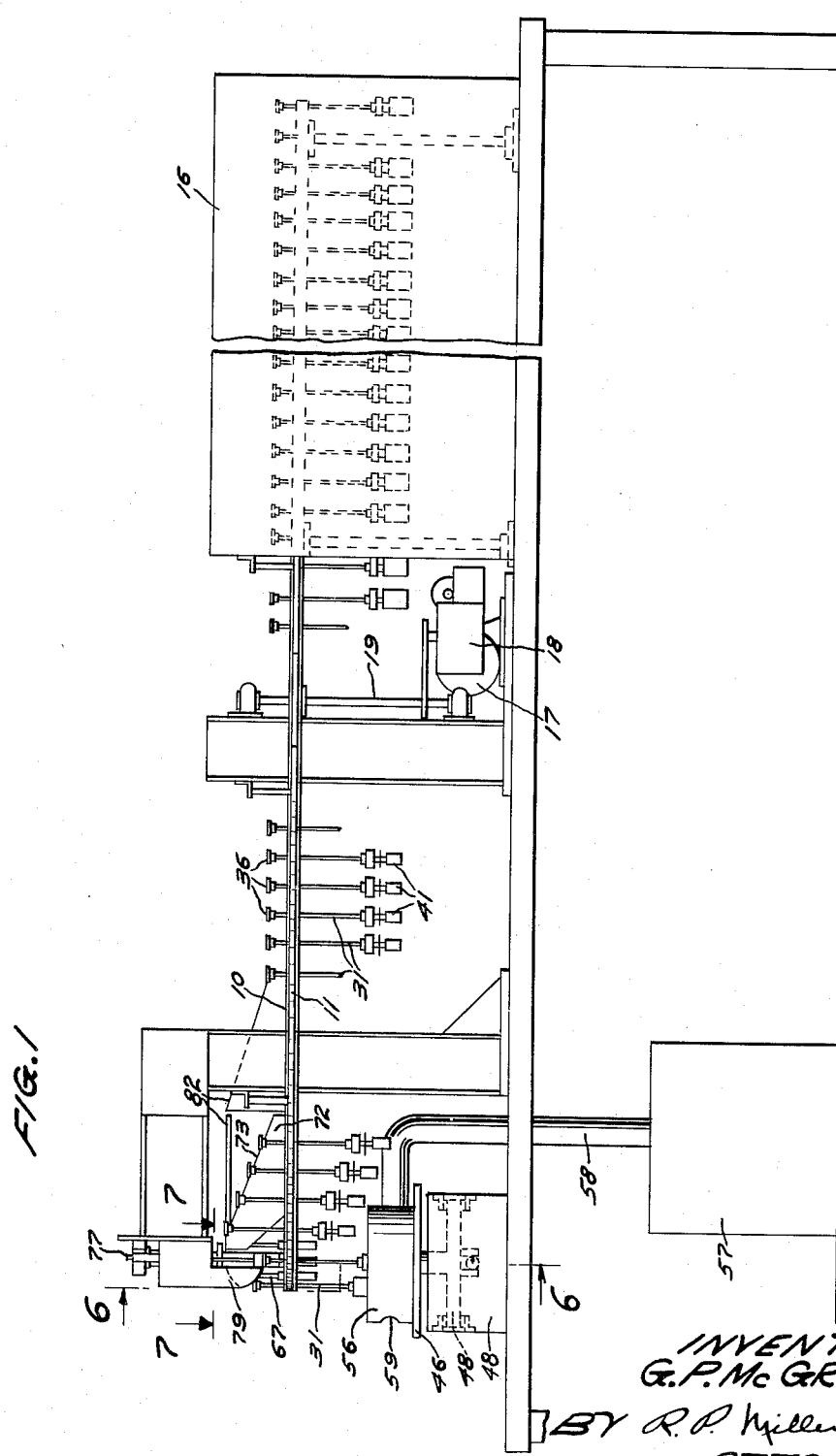
FIG. 1 is a side elevation view of a machine for the dip-coating of articles embodying the principles of the instant invention.
Figure 7:
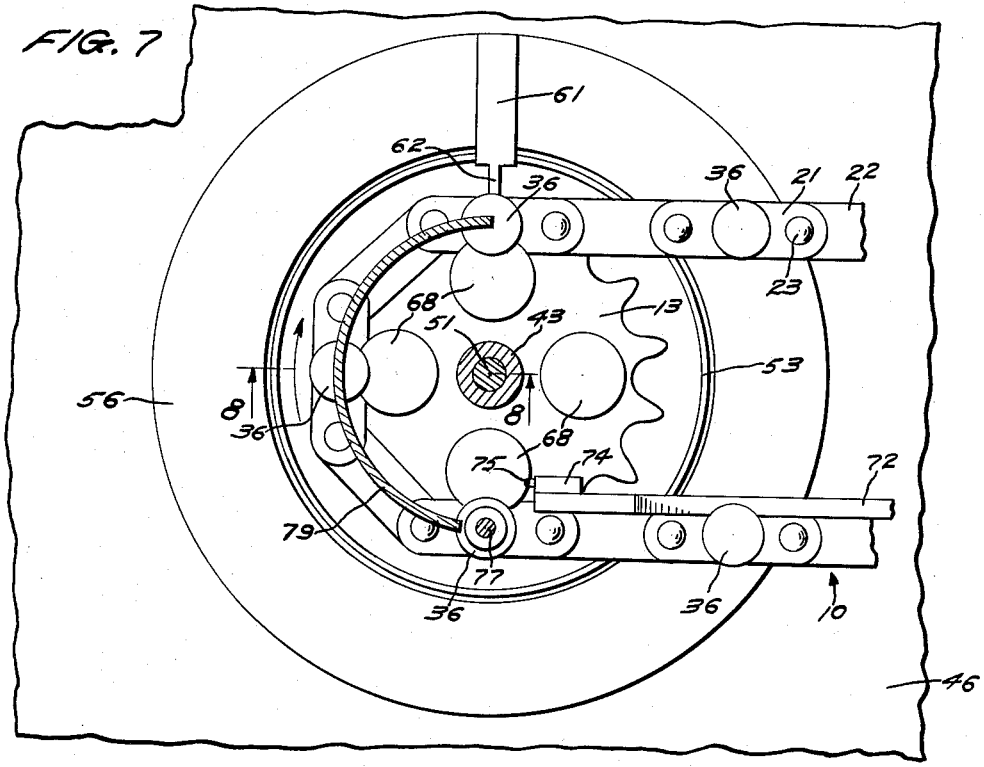
FIG. 7 is an enlarged view along lines 7—7 of FIG. 1 disclosing a portion of a mechanism which controls the movements of the article-gripping means relative to the conveyor.

Attention is now directed to FIGS. 1–3 wherein is shown a machine for the dip-coating of articles. The machine comprises a chain link conveyor 10 forming a continuous loop around a drive sprocket wheel 12 and an idler sprocket wheel 13. The chain 10 is additionally supported in a horizontal position by a pair of rails 11 positioned on each side of the chain and between the sprocket wheels. Additional idler sprocket wheels 14 may be used to extend the conveyor 10 as may be desired to drive the conveyor through a drying oven 16 subsequent to a dipping operation. The sprocket wheel 12 is driven by a motor 17 through a speed reducer 18 and a shaft 19.

The chain link conveyor 10 is made up of outer links 21 and inner links 22 pinned together by means of pins 23 and held in spaced relationship by means of spacers 24. Extending through suitable apertures 26 (FIG. 8) in the outer links 21 are tubular housings 27 mounted to the links 21 by means of collars 28 mounted on the outer links 21. Mounted within each extremity of each tubular housing 27 is a bearing 29 which slidably supports a vertically extending rod 31. The rod 31 is keyed to the housing 27 by a screw 33 extending into a slot 32 which prevents the rod from rotating within the bearings 29 but allows the rod to have free vertical movement. The rod 31 is provided at the upper extremity thereof with a cap 34 having a flange 36. A locating collar 37 is mounted on the rod by means of a screw 38 to limit the downward movement of the rod 31 in the bearings 29. The lower extremity of each rod is provided with an article-gripping means (FIGS. 4 and 5) which may comprise of a spring clip 39 (see FIGS. 4 and 5) for holding a pair of mounting screws 42 extending from a capacitor 41.

Referring now to FIG. 6, the idler sprocket wheel 13 is rotatably mounted by means of a shaft 43 mounted in bearings 44 connected to any suitable framework for the machine. Beneath the idler wheel 13 is a base 46 mounted on a shaft 47 and vibrated in a horizontal plane by means of any suitable mechanism 48' within housing 48. A circular platform 49 is rotatably mounted on the base 46 with the axis of rotation thereof in alignment with the axis of rotation of the idler wheel 13. Shafts 51 and 52 connect the idler wheel 13 with the platform 49 through resilient universal joints 50 so that when the conveyor 10 causes the wheel 13 to rotate the platform 49 will likewise rotate at the same speed and in the same direction.

Figure 8:
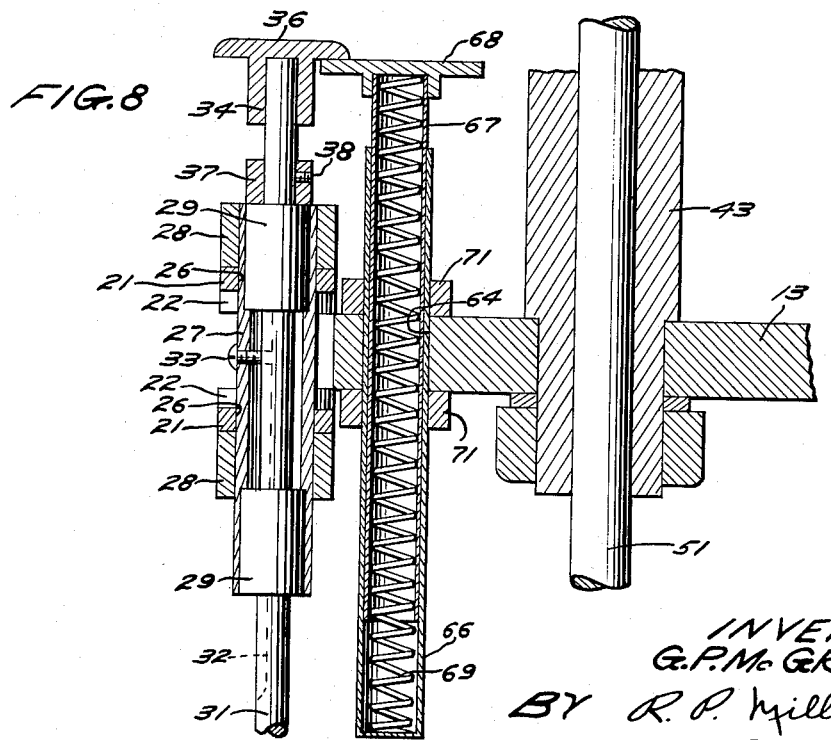
FIG. 8 discloses a view along lines 8—8 of FIG. 7 disclosing the mechanism of FIG. 7 and particularly illustrating a spring biased plunger for supporting one of the vertical rods.

An annular container 53 filled with a coating material 54, such as an epoxy resin compound, is positioned on the platform 49 concentric with the axis of rotation of the platform and beneath the periphery of the sprocket wheel 13. A housing 56 is mounted on the base 46 around the platform 49 and the sides of the container 53 for conducting cold air, from a blower 57 (FIG. 1)

and a flexible pipe 58, around the container 53 and out of an aperture 59 formed in the housing 56. Mounted on the housing 56 is a brace 61 supporting scrapers 62 positioned on the sides and bottom of the containers 53. Extending through idler wheel 13 within suitable apertures 64 are cylindrical housings 66 securely mounted to the idler wheel 13 by means of collars 71 as shown in FIG. 8. Each housing 66 contains a plunger 67 having a disk 68 mounted on the upper extremity thereof. The plungers 67 are urged upwardly by means of springs 69 bearing against the bottom of the housings 66 and the disks 68.

Positioned along the path of the conveyor 10 and before the idler wheel 13 is a cam 72 having a gradually sloping upper surface 73 which engages the peripheral flanges 36 of the caps 34 mounted on the rods 31 and moves the rods 31 upwardly relative to the conveyor 11 as the conveyor moves around the wheel 13. At the top of the cam 72, the flange 36 of each rod 31 is placed over a disk 68 of each plunger 67. The plungers are spaced around the idler wheel 13 with the same spacing as the spacing between the rods 31 on the conveyor 10. As the flange 36 leaves the upper surface 73 of the cam 72 and is positioned on a disk 68, the weight of the rod 31 and capacitor 41 carried thereby compresses the spring 69 urging the plunger downwardly a sufficient amount to trip an actuator 75 of a micro-switch 74 (FIG. 6) which effectuates the actuation of an air cylinder 76 mounted on a brace 78 by any suitable means (not shown) to move a piston or ram 77 downwardly to force the rod 31 and plunger 67 downwardly towards the idler wheel 13. As the rod 31 is moved up the cam 72, the capacitor 41 carried on the lower extremity of the rod is raised up and over the walls of the container 53, and when the piston 77 forces the rod 31 downwardly, the capacitor 41 is immersed in the coating material 54. When the rod 31 and plunger 67 are in the downward position, the conveyor 10 continues to move the rod and plunger until the flange 36 of the rod 31 is positioned under the lower surface 81 of a cam 79 which is positioned above the idler wheel 13 and extends around the periphery of the wheel. The piston 77 is moved back to its upper position shown in FIG. 6 after a predetermined time delay. The time delay is attained by use of well-known facilities being incorporated in the control means (not shown) for the air cylinder 76.

As the conveyor 10 continues to move the rod 31 around the idler wheel 13, the spring-urged plunger 67 forces the cap 34 of the rod 31 against the lower surface 81 of the cam 79 having a gradually upward slope such that the capacitors 41 are raised at a controlled rate out of the coating material 54 and over the walls of the container 53 until the flange 36 of the rod 31 is placed upon a third cam 82 which gradually lowers the rod and capacitor carried thereon to the original position on the conveyor 10.

*Operation*

In the operation of the above-described machine, an epoxy resin coating material 54 is placed in the container 53. As certain epoxy resin compounds are of the thermosetting type which produce a self-generated heat to set or harden the resin, a combination of three features are used to retard the hardening process. First, the container 53 is positioned on the platform 49 which is in turn mounted on the base 46 vibrated by the mechanism within the housing 48. The vibrations imparted to the container 53 causes agitation of the coating material 54 tending to prevent the material from solidifying. Secondly, cold air is directed from the blower 57 through the pipe 58 and into the housing 56 to circulate the cold air around the container 53 which tends to keep the coating material 54 at a lower temperature to again retard the hardening process. Thirdly, the setting or hardening process of the coating material 54 is retarded by means of the scraper 62 positioned along the walls and bottom of the container 53 to prevent the material 54 from solidifying along the walls and bottom of the container and to again supply an agitation to the material.

After the coating material 54 is placed in the container 53 and the vibrator within the housing 48 and the blower 57 are operating, an attendant mounts capacitors 41 on rods 31 by means of spring clips 39 and starts the movement of the conveyor 10. As the rods 31 move along with the conveyor 10, the cam 72 engages the flange 36 on each rod 31 to move the capacitors 41 above the walls of the container 53 and to place the flange 36 on the disc 68 of the plunger 67. As the flange 36 leaves the cam 72, microswitch 74 is actuated to operate the air cylinder 76 to move the piston 77 downwardly to immerse the capacitor 41 in the coating material 54 and to place the flange 36 of the rods 31 under the lower surface 81 of the cam 79. As the conveyor continues to rotate, the plungers 67 force the flanges 36 against the surface 81 to slowly raise the capacitors 41 from the coating material 54 and over the walls of the container 53. At this point the flanges 36 are placed on a cam 82 which slowly lowers the rods 31 and capacitors 41 carried thereby to the original position on the conveyor 10 and allows the conveyor to move the articles to a subsequent station such as the drying oven 16. It will be noted, that as the shafts 51 and 52 connect the platform 49 to the idler wheel 13, the container 53 will be caused to rotate at the same speed as that of the capacitors 41 carried by the conveyor 10 to prevent a relative flowing movement between the coating material 54 and the capacitors, thereby preventing a heavier coating on one side of the capacitors than on the other.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A dip coating machine which comprises, a continuously moving chain conveyor forming a horizontal loop extending along a predetermined path, vertically extending rods movably mounted on said conveyor each having a peripheral flange in engagement with said chain conveyor, an article gripping means on the lower extremity of each rod for gripping and carrying articles, a container of coating material positioned along a portion of said predetermined path, first camming means having a gradually inclined surface adjacent a portion of said predetermined path approaching the container for engaging the peripheral flange of each rod to raise the rod and article carried thereby over the walls of the container, and having a vertical surface for allowing the rod to fall to immerse the article in the coating material, a second camming means having a downwardly facing gradually upwardly inclined surface extending over said container, and spring means for urging the flange of each rod against the downwardly facing surface of said second camming means for gradually lifting the rod and article from the container.

2. A dip coating machine which comprises, a driven rotating sprocket wheel and a follower sprocket wheel, a chain having apertures therein forming a horizontal loop around the sprocket wheels and moved thereby, vertically extending rods slidably mounted in the apertures and each having a peripheral flange on the upper extremity for engaging the chain to limit the downward movement thereof, an article gripping means on the lower extremity of each rod for carrying articles to be coated, a container of coating material positioned beneath said follower sprocket wheel, a plurality of plungers mounted on the follower sprocket wheel and spaced apart a distance equal to the spacing between the rods, means for urging the plungers upwardly to a predetermined position above said wheel, each of said plungers being movable with said wheel into a position adjacent the path of movement of the rods, a first camming means positioned along said loop and before the follower wheel for engaging the peripheral flange of each rod and raising the rod and article carried thereby to place the flange of the rod in engagement with one of the plungers, a second camming means positioned around the follower wheel having a gradually raising lower surface, means actuated by the peripheral flange of a rod engaging one of the plungers for forcing the rod and plunger downwardly to immerse the article carried by the rod into the coating material and to position the flange beneath the second camming means whereby the article is raised gradually from the coating material as the flange is moved along the lower surface of the second camming means, and a third camming means positioned along the loop and after the follower wheel for receiving the flange of each rod from the plunger to gradually lower the flange into engagement with the chain.

3. A machine for dipping articles into a self-hardening coating material which comprises, a conveyor for moving articles along a predetermined path, a vibratable base positioned along said path, a platform mounted on said base for movement along a portion of said path, a container of self-hardening coating material mounted on said platform for movement therewith, housing means surrounding the sides of said platform and container, means for blowing cool air into said housing and around the container to retard the hardening process of the coating material, a scraping means mounted on said housing means and engaging the walls and bottom of said container to prevent the coating material from adhering to the container, means for immersing the articles carried by the conveyor into said container, means for moving the platform along said base at the same speed as the movement of the conveyor for preventing relative flowing movement between the articles and coating material, and means for vibrating said base for agitating the coating material.

4. A dip coating machine which comprises, a continuous chain link conveyor having apertures therein, first and second sprocket wheels for supporting said chain link conveyor in a horizontal loop, a drive means connected to the first wheel for moving the chain conveyor around the loop, vertical rods slidably mounted in said apertures each having a peripheral flange on the upper end thereof for resting on the chain conveyor and limiting the downward movement of the rod, an article gripping means mounted on the lower end of each rod for moving articles with the conveyor, a vibratable base positioned beneath the second wheel, a platform rotatably mounted on said base with the axis of rotation thereof coinciding with the axis of rotation of the wheel, an annular container of coating material positioned on the platform beneath the periphery of the second wheel, a first camming means having a gradually inclined surface for engaging the peripheral flange of each rod for raising the rod over the walls of the container, and having a vertical surface for allowing the rods to move downwardly to immerse the articles in the coating material, a second camming means positioned above the container having a gradually inclined lower surface, means engaging each peripheral flange for forcing the flange against the lower surface of the second camming means to gradually withdraw the article from the coating material, a shaft connecting the platform and the second wheel for rotating said platform at the same speed as the conveyor to prevent relative flowing movement between the articles and coating material, and means for vibrating said base to agitate the coating material.

5. Apparatus for dip coating articles which comprises, a continuous conveyor, a rotatable horizontally disposed wheel in engagement with said conveyor and movable therewith, horizontally spaced vertically extending article-carrying rods slidably mounted on said conveyor for vertical movement relative thereto, a container of coating material mounted beneath said wheel and beneath the path of movement of said rods, a flange on each of said rods, upwardly biased members arranged for rotation with said wheel and spaced apart a distance equal to the spacing between said rods, said members being movable vertically relative to said wheel adjacent the path of movement of said rods in supporting engagement with said flanges, first camming means positioned adjacent said conveyor for engaging the flange of each rod during the movement thereof with said conveyor, to raise said rod and an article carried thereby above the walls of the container, and to position said flange of said rod on one of said upwardly biased members, second camming means positioned adjacent the periphery of said wheel and having a downwardly facing cam surface which rises gradually in the direction of movement of said conveyor, and means for forcing said rod and said upwardly biased member downwardly, to immerse an article carried by said rod in the coating material and to position said flange of said rod beneath the downwardly facing cam surface of said second camming means, said rod and an article carried thereby being raised gradually from the coating material above the walls of said container by said upwardly biased member as said flange moves along the downwardly facing cam surface of said second camming means.

6. Apparatus for dip coating articles as recited in claim 5, which further includes third camming means positioned adjacent said conveyor for receiving said flanges of said rods from said upwardly biased members to gradually lower said rods back into their original positions relative to said conveyor.

7. Apparatus for dip coating articles as recited in claim 5, which further includes means mounting said container for rotation concentric with the axis of rotation of said wheel, and a shaft connecting said container and said wheel along their concentric axes of rotation for rotating said container at the same speed as said conveyor.

8. A conveyor system which comprises, a continuous chain conveyor movable around a predetermined horizontal path, a drive means for moving said conveyor, vertically extending rods slidably mounted on said conveyor for vertical movement relative to said conveyor and each having a peripheral flange thereon for limiting the downward movement of the rod, an article gripping means on the lower end of each rod for supporting and carrying articles with the conveyor, a camming means positioned along and above the conveyor path, and spring urged means for engaging the peripheral flange of each rod for forcing the rod against the camming means for moving the articles according to the contour of the camming means while the articles are moved around the predetermined path.

9. A conveyor system for imparting vertical movements to an article carried thereby which comprises, a continuous conveyor, first and second wheels for supporting said conveyor for movement in a horizontal loop, a drive means connected to the first wheel for moving the conveyor around the loop, vertically extending carrying means having a flange thereon and movably mounted on said conveyor for holding and moving articles with the conveyor, spring biased plunger means mounted on said second wheel and urged to a position above the wheel, camming means positioned above the second wheel and following the path of the conveyor and having a lower surface below said plunger means, means for moving each carrying means relative to the conveyor to engage the flange thereof with the plunger means, and means forcing the plunger and carrying means beneath the camming means whereby the article receives vertical movement corresponding to the lower surface of the camming means as the carrying means passes around the second wheel.

10. A conveyor system for imparting vertical movement to an article carried thereby which comprises, horizontally positioned first and second sprockets, a continuous chain link conveyor forming a horizontal loop around the first and second wheel, a drive means connected to the first wheel for moving the conveyor around the loop, vertically extending rods slidably mounted on said chain and each having a peripheral flange on the upper end thereof for engaging the chain and limiting the downward movement of the rod, an article gripping means on the lower end of each rod for carrying articles with the conveyor, cylindrical housings mounted on and extending below the second wheel and spaced apart a distance equal to the spacing between the rods, plungers slidably mounted in said housings, means urging the plungers partially out of the housing above said second wheel to a predetermined position, a disk on the upper extremity of each plunger, a camming means having a lower surface following the path of the chain around the second wheel and positioned below said predetermined position, means for moving each rod relative to the chain to position the flange thereof upon the disk of a plunger, and means for forcing the plunger and rod beneath the camming means whereby the articles are moved vertically according to the contour of the lower surface of the camming means as the rods are moved around the second wheel.

References Cited in the file of this patent
UNITED STATES PATENTS

| | | |
|---|---|---|
| 757,186 | Fancher | Apr. 12, 1904 |
| 839,719 | Broderick | Dec. 25, 1906 |
| 2,155,995 | Robb | Apr. 25, 1939 |
| 2,179,035 | Ferry | Nov. 7, 1939 |
| 2,216,498 | Muir | Oct. 1, 1940 |
| 2,554,803 | Wysocki | May 29, 1951 |
| 2,657,668 | Maier | Nov. 3, 1953 |
| 2,750,923 | Daniel | June 19, 1956 |
| 2,862,236 | Shapero | Dec. 2, 1958 |